(12) United States Patent
Kwak et al.

(10) Patent No.: US 10,187,926 B2
(45) Date of Patent: Jan. 22, 2019

(54) APPARATUS AND METHOD FOR SETTING UP ACTIVE NETWORKING OF SMART DEVICES FOR PROVIDING CONVERGED SERVICE

(71) Applicant: ELECTRONICS AND TELECOMMUNICATIONS RESEARCH INSTITUTE, Daejeon (KR)

(72) Inventors: Ji-Young Kwak, Gwangju (KR); Seon-Tae Kim, Daejeon (KR)

(73) Assignee: Electronics and Telecommunications Research Institute, Daejeon (KR)

( * ) Notice: Subject to any disclaimer, the term of this patent is extended or adjusted under 35 U.S.C. 154(b) by 556 days.

(21) Appl. No.: 14/138,384

(22) Filed: Dec. 23, 2013

(65) Prior Publication Data

US 2014/0330905 A1 Nov. 6, 2014

(30) Foreign Application Priority Data

May 2, 2013 (KR) ........................ 10-2013-0049385

(51) Int. Cl.
*H04W 84/18* (2009.01)
*H04W 40/10* (2009.01)
(Continued)

(52) U.S. Cl.
CPC ........... *H04W 84/18* (2013.01); *H04L 45/026* (2013.01); *H04L 45/124* (2013.01);
(Continued)

(58) Field of Classification Search
CPC . H04L 65/1006; H04L 67/1093; H04L 67/12; H04L 67/327; H04L 65/1013;
(Continued)

(56) References Cited

U.S. PATENT DOCUMENTS 7,072,303 B2 * 7/2006 MeLampy ........ H04L 29/06027
370/238
7,173,925 B1 * 2/2007 Dantu ................... H04W 76/02
370/352

(Continued)

FOREIGN PATENT DOCUMENTS

KR 10-2004-0061079 A 7/2004
KR 10-2005-0053083 A 6/2005

OTHER PUBLICATIONS

Song, Dawen, Yijun Mo, and Furong Wang. "Architecture of multiparty conferencing using SIP." In *Wireless Communications, Networking and Mobile Computing, Proceedings, International Conference on*, vol. 2, pp. 1361-1364. IEEE, 2005.

*Primary Examiner* — Gregory G Todd
(74) *Attorney, Agent, or Firm* — NSIP Law (57) ABSTRACT

Disclosed herein is a method for setting up active networking of smart devices for providing a converged service. In the method of setting up active networking of smart devices for providing a converged service, each of a plurality of smart objects broadcasts location information thereof. A smart object neighboring a largest number of smart objects is selected as a smart zone manager from among the plurality of smart objects. The selected smart zone manager broadcasts smart zone information to neighbor smart objects, and then forms a smart zone.

16 Claims, 6 Drawing Sheets

(51) Int. Cl.
*H04L 12/721* (2013.01)
*H04L 12/751* (2013.01)
*H04L 29/08* (2006.01)
*H04L 29/06* (2006.01)
*H04W 4/02* (2018.01)
*H04W 76/14* (2018.01)

(52) U.S. Cl.
CPC ...... *H04L 65/1006* (2013.01); *H04L 65/1013* (2013.01); *H04L 67/1042* (2013.01); *H04L 67/1044* (2013.01); *H04L 67/12* (2013.01); *H04W 40/10* (2013.01); *H04L 67/02* (2013.01); *H04L 67/10* (2013.01); *H04L 67/1093* (2013.01); *H04W 4/02* (2013.01); *H04W 76/14* (2018.02)

(58) Field of Classification Search
CPC .. H04L 67/104–67/1051; H04L 45/026; H04L 45/124; H04L 45/125; H04L 45/127; H04W 84/18; H04W 40/10; H04W 40/04; H04W 40/20
See application file for complete search history.

(56) References Cited

U.S. PATENT DOCUMENTS

| | | | |
|---|---|---|---|
| 7,835,301 B1* | 11/2010 | Maufer | H04W 24/02 370/254 |
| 7,844,294 B1* | 11/2010 | Manroa | G06Q 10/10 455/518 |
| 8,009,648 B2* | 8/2011 | Kuliner | H04W 84/18 370/338 |
| 8,265,870 B1* | 9/2012 | Nguyen | G01V 1/24 701/450 |
| 8,345,609 B2* | 1/2013 | Patil | H04W 74/0841 370/329 |
| 8,924,570 B2* | 12/2014 | Stevens | H04W 84/18 709/227 |
| 10,051,068 B2* | 8/2018 | Sharma | H04L 67/26 |
| 2003/0202524 A1* | 10/2003 | Conner | H04L 45/20 370/408 |
| 2004/0132452 A1 | 7/2004 | Lee | |
| 2006/0121913 A1* | 6/2006 | Lin | H04W 4/02 455/456.1 |
| 2007/0127421 A1* | 6/2007 | D'Amico | H04W 72/005 370/338 |
| 2007/0150565 A1* | 6/2007 | Ayyagari | H04L 67/12 709/223 |
| 2007/0282685 A1 | 12/2007 | Huh et al. | |
| 2008/0062941 A1* | 3/2008 | Rhee | H04W 40/246 370/338 |
| 2008/0109536 A1* | 5/2008 | Hong | H04L 67/1002 709/220 |
| 2009/0285204 A1* | 11/2009 | Gallant | G06Q 20/102 370/352 |
| 2009/0319657 A1* | 12/2009 | Yang | H04L 43/0817 709/224 |
| 2010/0182395 A1* | 7/2010 | Delhoyo | H04N 7/15 348/14.08 |
| 2011/0055380 A1* | 3/2011 | Yockey | H04L 41/0896 709/224 |
| 2013/0007848 A1* | 1/2013 | Chaskar | H04W 12/12 726/4 |
| 2013/0134212 A1* | 5/2013 | Chang | G06F 11/0742 235/375 |
| 2013/0157692 A1* | 6/2013 | Hall | H04L 12/1845 455/456.3 |
| 2013/0223229 A1* | 8/2013 | Hui | H04W 40/02 370/238 |
| 2014/0002584 A1* | 1/2014 | Moon | H04L 12/1818 348/14.08 |
| 2014/0047487 A1* | 2/2014 | Guedalia | H04W 4/70 725/80 |
| 2015/0127733 A1* | 5/2015 | Ding | H04W 4/08 709/204 |

\* cited by examiner

APPARATUS AND METHOD FOR SETTING UP ACTIVE NETWORKING OF SMART DEVICES FOR PROVIDING CONVERGED SERVICE

CROSS REFERENCE TO RELATED APPLICATION

This application claims the benefit of Korean Patent Application No. 10-2013-0049385, filed on May 2, 2013, which is hereby incorporated by reference in its entirety into this application.

BACKGROUND OF THE INVENTION

1. Technical Field

The present invention relates generally to an apparatus and method for setting up active networking of smart devices for providing a converged service and, more particularly, to a method of setting up, releasing, and changing a plurality of service sessions and a method of establishing a transmission path depending on the characteristics of service transmission data, which are based on a service virtual network composed of smart devices by extending an Session Initiation Protocol (SIP) so that a smart networking service working in conjunction with the SIP-based service of an existing infrastructure network can be supported.

2. Description of the Related Art

Ubiquitous networking denotes the capability to support a communication function in all objects and to enable networking to be performed in any form at anytime and anywhere in any type of environment, regardless of whether or not an agent of communication has been recognized. In such a ubiquitous networking environment, person-to-object and object-to-object communications may be supported by providing various types of applications and services required depending on place, time, and situations. A large number of standards for ubiquitous networking technology are under development, and the commercialization of related technology is also being conducted. However, since most standards developed in this manner are devised and applied to be usable only in a specific domain, a signaling conversion and system reconfiguration task is required so that dissimilar standards of different domains are compatible with each other to provide a converged service spanning across other domains. Therefore, new converged services must be able to be supported by adopting existing service signaling protocols that enable signaling to be conveniently extended and by extending and applying the service signaling protocols so that a smart service in which an application service is applied to other domains or in which different domain services are merged may be easily supported while working in conjunction with the application service of an existing infrastructure network in a future ubiquitous networking environment.

Representative application layer signaling protocols on an Internet Protocol (IP) network include H.323 of the International Telecommunication Union (ITU) and Session Initiation Protocol (SIP) of the Internet Engineering Task Force (IETF). Compared to H.323 using Abstract Syntax Notation One (ASN.1) Packed Encoding Rules (PER) encoding, SIP is advantageous in that it is a text-based protocol and is relatively uncomplicated, thus facilitating the implementation of the protocol. Further, SIP is a protocol for performing the function of setting up, releasing, and changing a session independent of transmission content so that it is applicable to services, such as multimedia conferences and Voice over Internet Protocol (VoIP). Such SIP has excellent scalability and is designed in a structure suitable for the configuration of a large-scale network.

Korean Patent No. 10-0498932 discloses technology for setting up a session in a wireless network composed of mobile nodes. This technology disclosed in the above Korean Patent merely presents various services based on a service virtual network composed of mobile devices using extended SIP without requiring an existing infrastructure network. However, this technology is limited in that it cannot provide a new smart converged service applied to different domains while working in conjunction with the SIP-based service of an existing infrastructure network.

SUMMARY OF THE INVENTION

Accordingly, the present invention has been made keeping in mind the above problems occurring in the prior art, and an object of the present invention is to provide technology for extending and applying SIP that has been widely utilized in existing services and that enables service sessions independent of transmission content to be set up, released and changed, and for setting up the sessions of a smart networking service constructed using smart devices and transmitting service data in consideration of the characteristics of service data while working in conjunction with an existing SIP-based service, in order to solve the problem of the conventional technology in that a smart service is not sufficiently activated due to the incompatibility of service signaling protocols limited to specific domains.

In accordance with an aspect of the present invention to accomplish the above object, there is provided a method of setting up active networking of smart devices for providing a converged service, including broadcasting, by each of a plurality of smart objects, location information thereof, selecting a smart object neighboring a largest number of smart objects as a smart zone manager from among the plurality of smart objects, and broadcasting, by the selected smart zone manager, smart zone information to neighbor smart objects, and then forming a smart zone.

Preferably, the method may further include comparing, by each of the plurality of smart objects, information about a neighbor smart object with information about a smart zone to which the corresponding smart object belongs, and recognizing the corresponding smart object itself as a smart zone router if the pieces of information are not identical to each other.

Preferably, the smart zone router may share smart zone information about a smart zone to which the smart zone router belongs with smart zone routers of other neighbor smart zones.

Preferably, broadcasting may be configured such that each of the plurality of smart objects broadcasts the location information thereof to one-hop neighbor smart objects.

Preferably, the smart zone information may include location information of smart objects belonging to the smart zone, and the smart zone manager may share the smart zone information with the smart objects belonging to the smart zone.

Preferably, the method may further include transferring, by a service initiation device, information about a converged service session to the smart zone manager, broadcasting, by the smart zone manager, the converged service session information to the smart objects and the smart zone router belonging to the smart zone, and transferring, by the smart zone router, information related to the converged service session to smart zone routers belonging to neighbor smart zones, and then forming service virtual networking.

Preferably, forming the service virtual networking may be configured such that a smart object desiring to join or leave the converged service session transfers information about joining or leaving to the service initiation device.

Preferably, the smart objects, the smart zone manager, and the smart zone router may transmit and receive the smart zone information via an extended Session Initiation Protocol (SIP) message.

Preferably, a smart object joining the converged service session may select a transmission path for service data to be transmitted in consideration of characteristics of data to be transmitted and device resources of neighbor smart objects, or transfer rate measured when the extended SIP message is received from the neighbor smart objects.

In accordance with another aspect of the present invention to accomplish the above object, there is provided an apparatus for setting up active networking of smart devices for providing a converged service, including a plurality of smart objects for forming a smart zone, and a smart zone manager for broadcasting smart zone information about the smart zone to the plurality of smart objects, and then forming the smart zone, wherein a smart object neighboring a largest number of smart objects is selected as the smart zone manager from among the plurality of smart objects.

Preferably, the apparatus may further include a smart zone router for sharing information about a smart zone to which the smart zone router belongs with neighbor smart zones, wherein each of the plurality of smart objects may compare information about a neighbor smart object with information about a smart zone to which the corresponding smart object belongs, and recognize the corresponding smart object itself as the smart zone router if the pieces of information are not identical to each other.

Preferably, the smart zone router may share smart zone information about the smart zone to which the smart zone router belongs with smart zone routers of other neighbor smart zones.

Preferably, each of the plurality of smart objects may broadcast location information thereof to one-hop neighbor smart objects, and detect a number of neighbor smart objects.

Preferably, the smart zone information may include location information of smart objects belonging to the smart zone, and the smart zone manager shares the smart zone information with the smart objects belonging to the smart zone.

Preferably, the apparatus may further include a service initiation device for transferring information about a converged service session to the smart zone manager, wherein the smart zone manager may broadcast the converged service session information to the smart objects and the smart zone router belonging to the smart zone, and wherein the smart zone router may transfer information related to the converged service session to smart zone routers belonging to neighbor smart zones.

Preferably, a smart object desiring to join or leave the converged service session may transfer information about joining or leaving to the service initiation device.

Preferably, a smart object joining the converged service session may select a transmission path for service data to be transmitted in consideration of characteristics of data to be transmitted and device resources of neighbor smart objects.

Preferably, a smart object joining the converged service session may select a transmission path for service data to be transmitted in consideration of transfer rate measured when an extended SIP message is received from the neighbor smart objects.

Preferably, the smart objects, smart zone manager, and the smart zone router may transmit and receive the smart zone information via an extended SIP message.

Preferably, the apparatus may further include a signaling gateway for performing signaling conversion so that SIP signaling of an infrastructure network and an extended SIP message are compatible with each other.

BRIEF DESCRIPTION OF THE DRAWINGS

The above and other objects, features and advantages of the present invention will be more clearly understood from the following detailed description taken in conjunction with the accompanying drawings, in which.

DESCRIPTION OF THE PREFERRED EMBODIMENTS

The present invention will be described in detail below with reference to the accompanying drawings. In the following description, redundant descriptions and detailed descriptions of known functions and elements that may unnecessarily make the gist of the present invention obscure will be omitted. Embodiments of the present invention are provided to fully describe the present invention to those having ordinary knowledge in the art to which the present invention pertains. Accordingly, in the drawings, the shapes and sizes of elements may be exaggerated for the sake of clearer description.

Hereinafter, preferred embodiments of the present invention will be described in detail with reference to the attached drawings.

Figure 1:
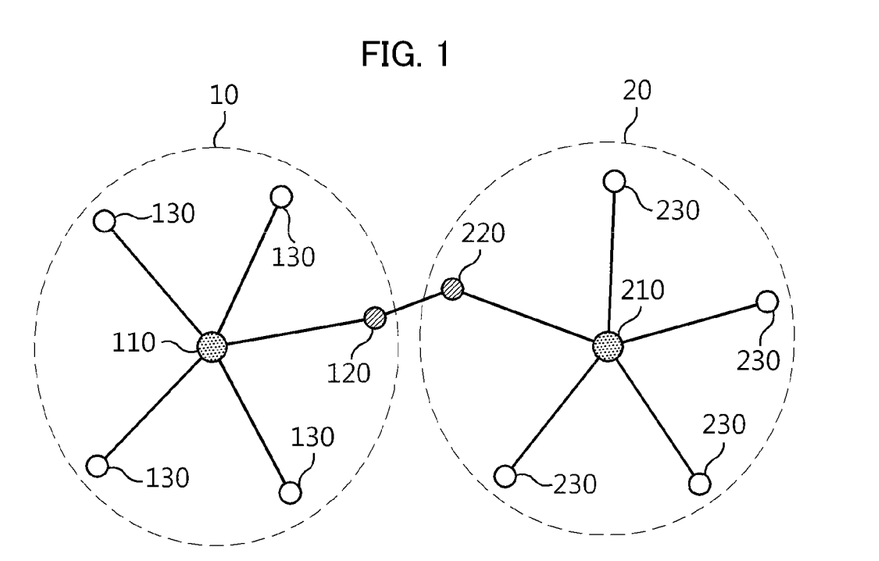
FIG. 1 is a diagram showing an example in which two smart zones work in conjunction with each other to form smart service networking according to an embodiment of the present invention.

FIG. 1 is a diagram showing an example in which two smart zones work in conjunction with each other to form smart service networking according to an embodiment of the present invention.

A plurality of smart zones according to the present invention may work in conjunction with each other to form smart service networking, but, in the present embodiment, two smart zones, that is, smart zone A 10 and smart zone B 20, will be described by way of example in detail for the convenience of description.

Each smart zone includes a smart zone manager 110 or 210, a smart zone router 120 or 220, and smart objects 130 or 230.

A procedure for forming the smart zones will be described in detail below. Before the smart zones are formed, each of all smart objects notifies one-hop neighbor smart objects of the presence thereof by broadcasting an extended SIP message OBJECT_INFO.

After the extended SIP message has been exchanged, smart objects having a largest number of neighbor devices are selected as the smart zone managers 110 and 210, and the selected smart zone managers 110 and 210 configure the smart zone A 10 and the smart zone B 20, respectively, by broadcasting an extended SIP message ZONE_INFO.

Each of the smart zone managers 110 and 210 functions as the manager of the smart zone for managing members using extended SIP messages ZONE_INFO/200 OK/606 Not Acceptable and transmitting the internal packets of the corresponding smart zone.

Each of the smart zone managers 110 and 210 that manage members performs the function of an SIP register for registering and managing location information carried in a 200 OK response message from each member, carries pieces of location information of all members within the smart zone in the Zone-Member header of the ZONE_INFO message, and sends the ZONE_INFO message, thus allowing all members to share the location information with each other.

The smart zone router 120 or 220 functions as a router for sharing the information of neighbor smart zones and transferring signaling packets or data packets to the neighbor smart zones.

That is, the smart zone router 120 of the smart zone A 10 and the smart zone router 220 of the smart zone B 20 may work in conjunction with each other and may share the smart zone information of the smart zone A 10 and the smart zone B 20 with each other.

Each smart object compares the Zone-ID header of the OBJECT_INFO message currently received from a neighbor smart object with the ID of the smart zone to which the corresponding smart object currently belongs. If the values are not identical to each other, the corresponding smart object is adjacent to the neighbor smart zone, and then the corresponding smart object recognizes itself as the smart zone router, changes the Object-Type header of the OBJECT_INFO message to the value of sZone_router, and sends the OBJECT_INFO message.

The smart zone router exchanges a NEIGHBOR_INFO message, in which a Zone-Member header is updated with the neighbor smart zone router, thus sharing member information with the neighbor smart zone router.

Figure 2:
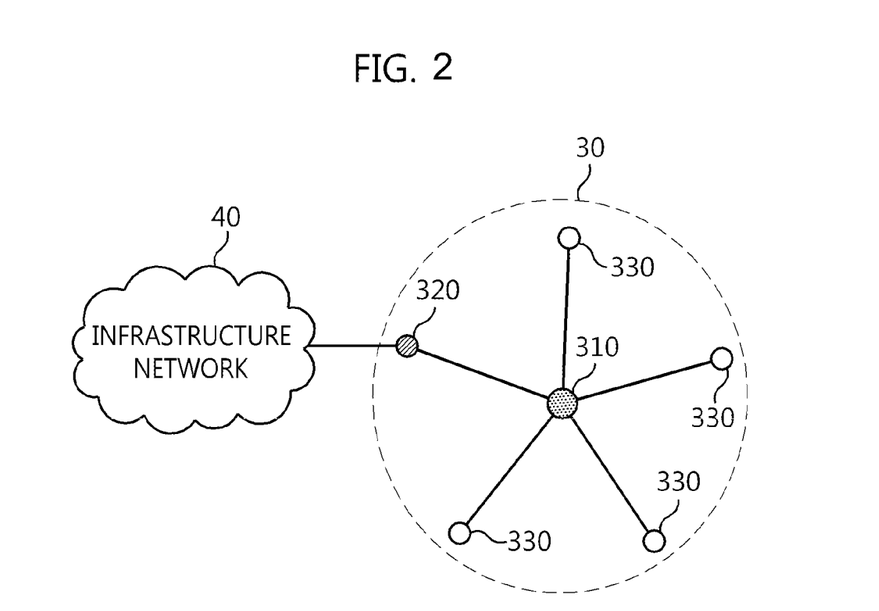
FIG. 2 is a diagram showing an example in which one smart zone works in conjunction with an existing infrastructure network to form smart service networking according to an embodiment of the present invention.

FIG. 2 is a diagram showing an example in which one smart zone works in conjunction with an existing infrastructure network to form smart service networking according to an embodiment of the present invention.

Referring to FIG. 2, smart zone C 30 working in conjunction with an infrastructure network according to the embodiment of the present invention includes a smart zone manager 310, a signaling gateway 320, a smart zone router, and smart objects 330.

A procedure for forming the smart zone C 30 will be described in detail below. Before the smart zone C 30 is formed, each of all smart objects notifies one-hop neighbor smart objects of the presence thereof by broadcasting an extended SIP message OBJECT_INFO.

After the extended SIP message has been exchanged, a smart object having a largest number of neighbor devices is selected as the smart zone manager 310, and the selected smart zone manager 310 configures the smart zone C 30 by broadcasting an extended SIP message ZONE_INFO.

The smart zone manager 310 functions as the manager of the smart zone for managing members using extended SIP messages ZONE_INFO/200 OK/606 Not Acceptable and transmitting the internal packets of the smart zone.

The smart zone manager 310 that manages members performs the function of an SIP register for registering and managing location information carried in a 200 OK response message from each member, carries pieces of location information of all members within the smart zone in the Zone-Member header of the ZONE_INFO message, and sends the ZONE_INFO message, thus allowing all members to share the location information with each other.

The signaling gateway 320 performs a signaling conversion function to be compatible with SIP signaling of the existing infrastructure network.

The signaling gateway 320 is configured to, when receiving the ZONE_INFO message periodically transmitted by the smart zone manager 310, send a 200 OK response message, in which signaling gateway address information, together with the Object-Type header of a signaling_gw value, are carried.

Then, the smart zone manager 310 updates the Gw-Info header of the ZONE_INFO message to the received signaling gateway address information, and then notifies the internal members of the smart zone C 30 of the ZONE_INFO message by sending the message to the internal members.

Since the signaling gateway 320 performs the function of an SIP register component, an SIP device present in an external infrastructure network notifies the signaling gateway of the location information thereof by registering the location information using a REGISTER message.

When each smart object 330 in the smart zone C 30 cannot detect the location of a device at a transmission destination from local cache information received via the ZONE_INFO message, it determines that a smart object 330 corresponding to the current destination is not present in the smart zone C 30, and transfers the local cache information to the signaling gateway or the smart zone router so that a final destination is detected and then the local cache information is transmitted to the final destination.

The present invention actively configures a plurality of smart zones using extended SIP messages to form smart service networking for mobile devices, and maintains connections with neighbor smart zones regardless of the mobility of devices.

Further, even if a device moves to another smart zone, a converged service session currently activated is maintained by extended SIP messages exchanged by the smart objects, smart zone managers, smart zone routers, and signaling gateways configuring the smart zones of FIGS. 1 and 2. In order to form such a smart zone, the smart zone members of FIGS. 1 and 2 function as SIP server components for processing the extended SIP messages depending on the roles allocated thereto.

When a service virtual network composed of a plurality of smart zones is configured, pieces of information about intra-zone devices and neighbor-zone devices are distributed and managed by the smart zone managers and smart zone routers, so that the number of control messages that are exchanged is limited, thus reducing a routing overhead and enabling information to be efficiently transferred.

Further, the present invention uses a method of setting up the session of a smart service in a service virtual network environment configured based on extended and applied SIP signaling and transmitting service data in consideration of the characteristics of the service data, thus easily supporting a smart service in which different types of domain services are merged while working in conjunction with the SIP-based service of the existing infrastructure network.

Figure 3:
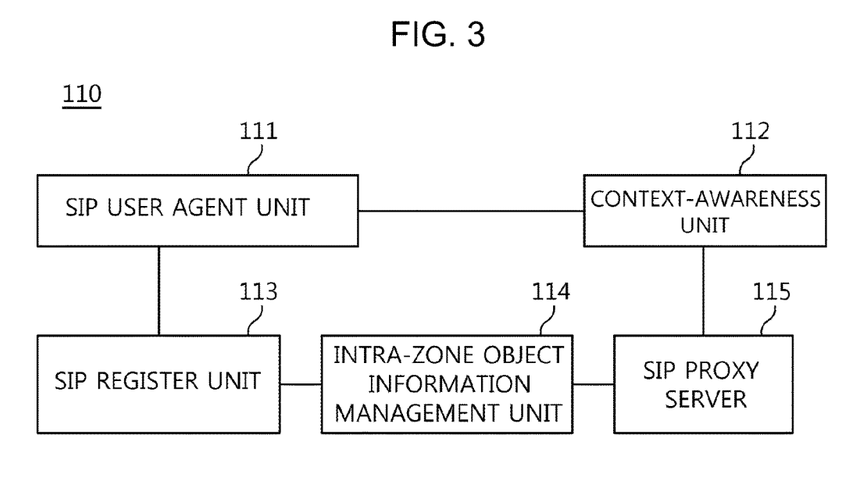
FIG. 3 is a diagram showing the configuration of a smart zone manager according to an embodiment of the present invention.

FIG. 3 is a diagram showing the configuration of a smart zone manager according to an embodiment of the present invention.

Referring to FIG. 3, a smart zone manager 110 according to the embodiment of the present invention includes an SIP user agent unit 111, a context-awareness unit 112, an SIP register unit 113, an intra-zone object information management unit 114, and an SIP proxy server 115.

The SIP user agent unit 111 generates a message defined in SIP, and broadcasts the message to the members of a smart zone through the SIP proxy server 115.

In this case, the SIP user agent unit 111 may generate extended SIP messages OBJECT_INFO, ZONE_INFO, NEIGHBOR_INFO, SETUP_GROUP/RESET_GROUP/RELEASE_GROUP, JOIN_GROUP/LEAVE_GROUP based on the internal roles of the configured smart zone and SIP messages defined in standards, and may transfer the generated SIP messages to the members of the smart zone through the SIP proxy server 115.

The context-awareness unit 112 may provide a context-awareness service to users in a ubiquitous computing environment.

The SIP register unit 113 may manage the members of the smart zone using extended SIP messages ZONE_INFO/200 OK/606 Not Acceptable, and may register and manage location information carried in 200 OK response messages from the members.

The intra-zone object information management unit 114 may manage and store information about smart objects present in the smart zone and information related to the setup, release, and change of a converged service session currently activated in the smart zone.

Figure 4:
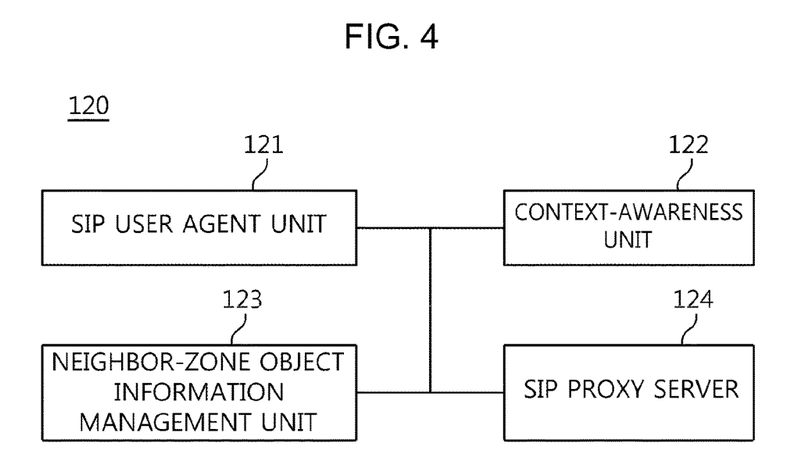
FIG. 4 is a diagram showing the configuration of a smart zone router according to an embodiment of the present invention.

FIG. 4 is a diagram showing the configuration of a smart zone router according to an embodiment of the present invention.

Referring to FIG. 4, a smart zone router 120 according to the embodiment of the present invention includes an SIP user agent unit 121, a context-awareness unit 122, a neighbor-zone object information management unit 123, and an SIP proxy server 124.

The SIP user agent unit 121, the context-awareness unit 122, and the SIP proxy server 124 have the same configurations as those of FIG. 3, and thus a detailed description thereof will be omitted.

The neighbor-zone object information management unit 123 may manage and store information about smart objects present in neighbor smart zones and information related to the setup, release, and change of converged service sessions currently activated with respect to the neighbor smart zones.

Figure 5:
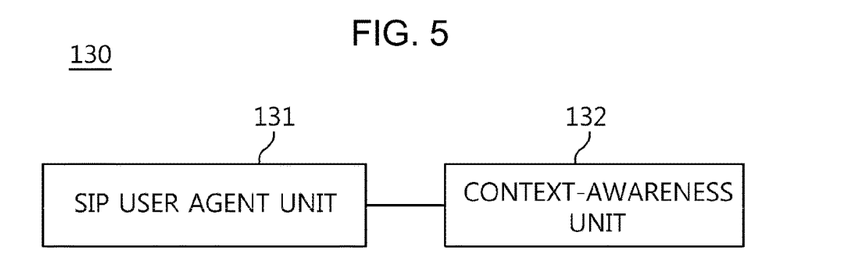
FIG. 5 is a diagram showing the configuration of a smart object according to an embodiment of the present invention.

FIG. 5 is a diagram showing the configuration of a smart object according to an embodiment of the present invention.

Referring to FIG. 5, a smart object 130 according to the embodiment of the present invention includes an SIP user agent unit 131 and a context-awareness unit 132. The SIP user agent unit 131 and the context-awareness unit 132 have the same configurations as those described above with reference to FIG. 3, and thus a detailed description thereof will be omitted.

Figure 6:
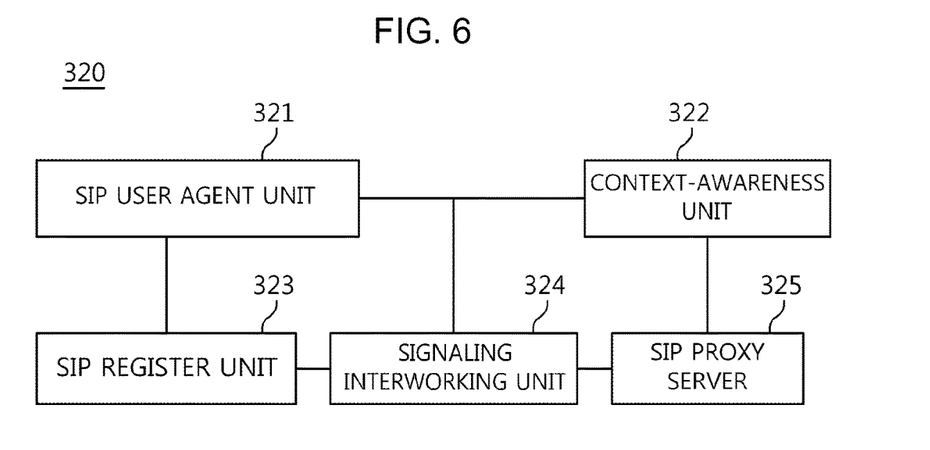
FIG. 6 is a diagram showing the configuration of a signaling gateway working in conjunction with an infrastructure network according to an embodiment of the present invention.

FIG. 6 is a diagram showing the configuration of a signaling gateway working in conjunction with an infrastructure network according to an embodiment of the present invention.

Referring to FIG. 6, a signaling gateway 320 according to the embodiment of the present invention includes an SIP user agent unit 321, a context-awareness unit 322, an SIP register unit 323, a signaling interworking unit 324, and an SIP proxy server 325.

The SIP user agent unit 321, the context-awareness unit 322, the SIP register unit 323, and the SIP proxy server 325 have the same configurations as those described above with reference to FIG. 3, and thus a detailed description thereof will be omitted.

The signaling interworking unit 324 may perform signaling conversion to be compatible with SIP signaling of the existing infrastructure network.

Figure 7:
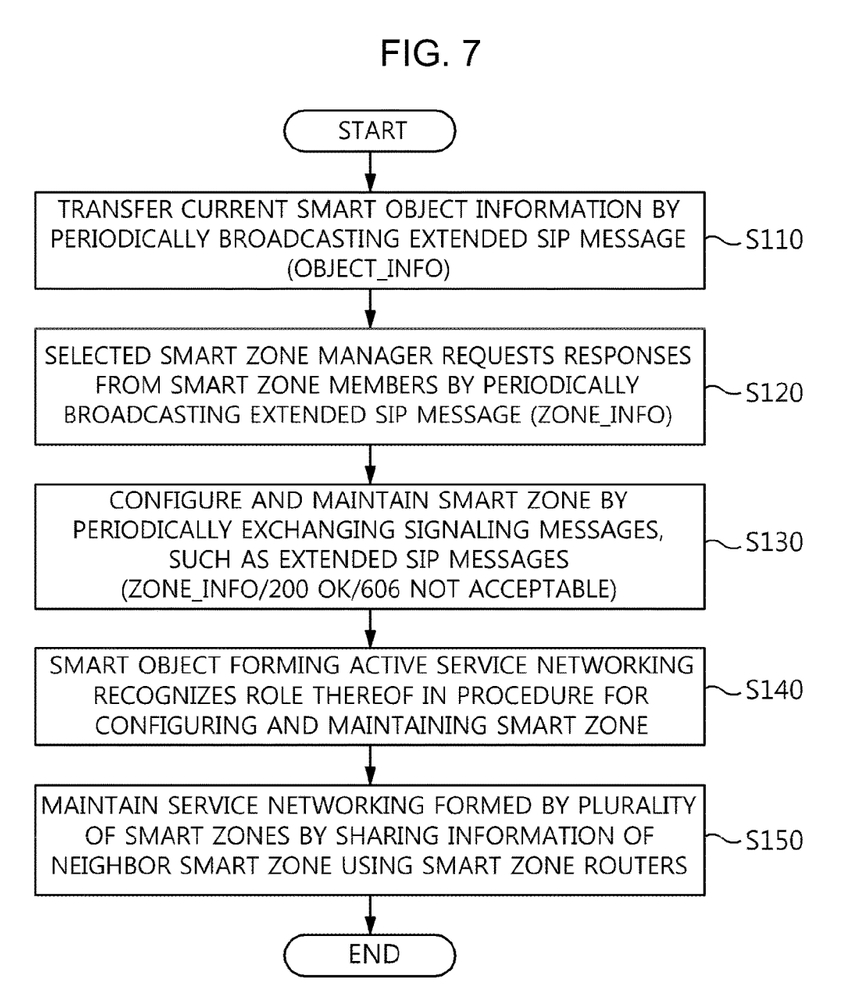
FIG. 7 is a diagram showing a process for configuring a smart service virtual network according to an embodiment of the present invention.

FIG. 7 is a diagram showing a process for configuring a smart service virtual network according to an embodiment of the present invention.

Referring to FIG. 7, in the process for configuring the smart service virtual network according to the embodiment of the present invention, each of all smart objects notifies one-hop neighbor smart objects of the presence thereof by broadcasting an extended SIP message OBJECT_INFO at step S110.

In this case, information about a current smart object may be transferred by periodically broadcasting the extended SIP message OBJECT_INFO.

After the extended SIP message has been exchanged, a smart object having a largest number of neighbor devices is selected as a smart zone manager, and the selected smart zone manager broadcasts an extended SIP message ZONE_INFO at step S120.

In this case, the selected smart zone manager requests responses from smart zone members by periodically broadcasting the extended SIP message ZONE_INFO.

Thereafter, the smart zone manager configures and maintains a smart zone by periodically exchanging signaling messages, such as extended SIP messages ZONE_INFO/200 OK/606 Not Acceptable, at step S130.

In this case, the smart zone manager functions as the manager of the smart zone, which manages members via the exchange of signaling messages, such as the extended SIP messages ZONE_INFO/200 OK/606 Not Acceptable, and transmits the internal packets of the smart zone. The smart zone manager for managing the members performs the function of an SIP register for registering and managing location information carried in 200 OK responses from the members, carries the location information of all members within the smart zone in the Zone-Member header of the ZONE_INFO message, and sends the ZONE-INFO message, thus allowing all the members to share the location information with each other.

Thereafter, the Zone-ID header of the OBJECT_INFO message received by the corresponding smart object from a neighbor smart object is compared with the ID of a smart zone to which the smart object currently belongs. If the values are not identical to each other, the corresponding smart object is adjacent to the neighbor smart zone. Thus, the corresponding smart object recognizes itself as a smart zone router, changes the Object-Type header of the OBJECT_INFO message to the value of sZone_router, and sends the OBJECT_INFO message, thus enabling the smart object forming the active service networking to recognize the role thereof in the procedure for configuring and maintaining the smart zone at step S140.

Thereafter, the smart zone router functions as a router for sharing the information of neighbor smart zones with the neighbor smart zones and transferring a signaling packet or a data packet to the neighbor smart zones. The smart zone router exchanges a NEIGHBOR_INFO message, in which a Zone-Member header is updated, with neighbor smart zone routers, so that the smart zone routers may share member information with each other, and service networking formed by a plurality of smart zones is maintained by sharing the information of the neighbor smart zones using the smart zone routers at step S150.

Figure 8:
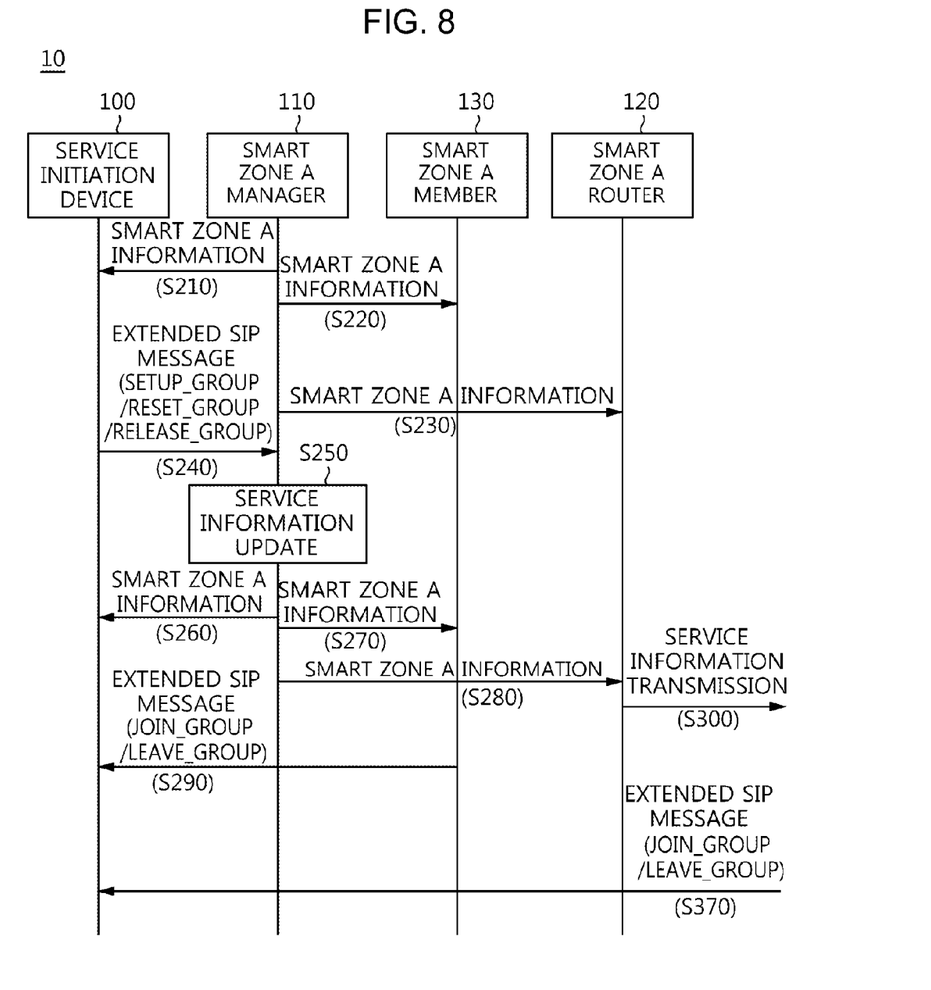
FIGS. 8 and 9 are diagrams showing a method of setting up a converged service session in a service virtual networking environment according to an embodiment of the present invention.
Figure 9:
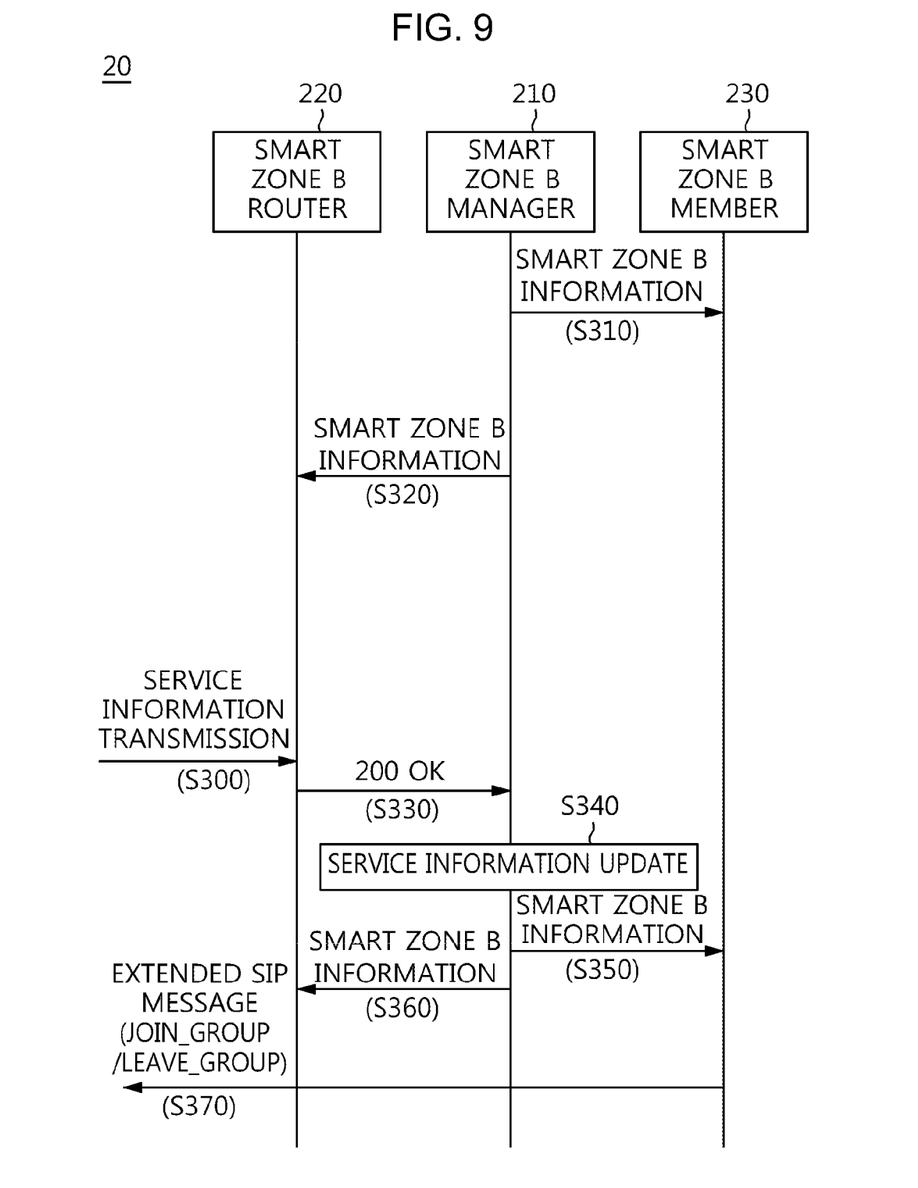

FIGS. 8 and 9 are diagrams showing a method of setting up a converged service session in a service virtual networking environment according to an embodiment of the present invention.

Referring to FIG. 8, in the method of setting up the converged service session in the service virtual networking environment according to the embodiment of the present invention, a smart zone A manager 110 belonging to smart zone A 10 individually transmits information about the smart zone A to a service initiation device 100, a smart zone A member 130, and a smart zone A router 120 using a ZONE_INFO message, and shares the information about the smart zone A with the service initiation device 100, the router 120, and the member 130 at steps S210, S220, and S230.

Then, the service initiation device 100 notifies the smart zone A manager 110 of converged service-related information by sending extended SIP messages SETUP_GROUP/RESET_GROUP/RELEASE_GROUP, required to request the setup, change, and release of a converged service session, to the smart zone A manager 110 at step S240.

When this converged service-related information is updated by receiving the extended SIP messages at step S250, the smart zone A manager 110 carries the updated converged service-related information in the Group-ID header of the periodically broadcasted ZONE_INFO message and sends the broadcasted ZONE_INFO message, thus notifying the members in the smart zone A of the current service-related information at steps S260, S270, and S280.

The smart zone A member 130 desiring to join or leave the service notified in this way allows a converged service session based on service virtual networking to be set up by sending an extended SIP message JOIN_GROUP/LEAVE_GROUP to a location corresponding to the location information of the service initiation device 100 in the Group-ID header, at step S290.

If the converged service session has been set up via the above procedure, a data packet is transferred to the smart zone A manager 110 when the destination device of the data packet to be transmitted is a member within the smart zone A 10.

Meanwhile, notification of the converged service session information of the smart zone A is provided by the Group-ID header information of NEIGHBOR_INFO transmitted from the smart zone A router 120 at step S300.

Referring now to FIG. 9, a smart zone B manager 210 belonging to a smart zone B 20 individually transmits information about the smart zone B to a smart zone B member 230 and a smart zone B router 220, thus sharing the smart zone B information with the smart zone B member 230 and the smart zone B router 220 at steps S310 and S320.

Thereafter, the smart zone B router 220 transfers the converged service session information notified at step S300 to the smart zone B manager 210 via a 200 OK response message to a ZONE_INFO message periodically transmitted by the smart zone B manager at step S330. When such converged service-related information is updated by the reception of the 200 OK message at step S340, the smart zone B manager 210 carries the updated converged service-related information in the Group-ID header of the ZONE_INFO message that is periodically broadcasted and broadcasts the ZONE_INFO message, thus notifying the members in the smart zone B of the current service-related information at steps S350 and S360.

The smart zone B member 230 desiring to join or leave the service notified in this way sends an extended SIP message JOIN_GROUP/LEAVE_GROUP to a location corresponding to the location information of the service initiation device 100 in the Group-ID header, thus enabling the converged service session to be set up based on service virtual networking at step S370.

If the converged service session has been set up via this procedure, a service data packet is transferred to the smart zone A router 120 and the smart zone B router 220 and is then finally transmitted to the destination device if the destination device of the service data packet to be transmitted is the smart object of the neighbor smart zone B 20.

When the service is initiated by the exchange of extended SIP messages, and responses to joining in the initiated service are received, the converged service session based on a plurality of configured smart zones is set up, and the devices joining the converged service session have different types of service data to be transmitted depending on the types of provided services.

The types of converged services that are used are variable depending on the domains of application and scenarios. In services such as VoIP, video conferences, or video surveillance, real-time data is transmitted in most cases, but, in factory automation or building automation services, non-real-time data such as device state information and control information is periodically transmitted in most cases.

Further, the types of devices to be utilized are also variable depending on the types of converged services that are used.

Therefore, smart objects joining the converged service session must select a transmission path of service data to be transmitted in consideration of the characteristics of data to be transmitted and the device resources of neighbor smart objects.

Once a service virtual network composed of a plurality of smart zones is formed, all smart objects periodically receive ZONE_INFO messages from individual smart zones, and OBJECT_INFO messages from neighbor smart objects. Each smart zone router receives NEIGHBOR_INFO messages from neighbor smart zone routers. While the service virtual network formed during the periodic exchange of the extended SIP messages is maintained, each of all smart objects must determine a transfer rate depending on the distances to neighbor smart objects and the performance of devices based on a signal-to-noise ratio measured when extended SIP messages are received from the neighbor smart objects, and must also consider the transfer rate upon selecting a transmission path for service data to be transmitted.

Device resource information, such as the transfer rate determined in this way, and the residual capacity of a battery, is carried in an SIP body part in the form of a Service Delivery Platform (SDP) or eXtensible Markup Language (XML), and is reported to neighbor smart objects, thus enabling an optimal transmission path to be selected in consideration of the device resource information and the characteristics of data desired to be transmitted upon transmitting converged service data.

For example, since real-time data such as audio data is sensitive to data transmission delay, the shortest transmission path must be selected to transmit the real-time data, but, in the case of non-real-time data such as device control data or state information data, a relatively long transmission path maximally guaranteeing transmission, rather than a short transmission path in which packet traffic is concentrated, must be selected to transmit the non-real-time data, so that optimal data transmission can be supported while the traffic of the entire service virtual network is distributed.

In accordance with embodiments of the present invention, various services may be initiated based on a service virtual network composed of smart devices using extended SIP without requiring an existing infrastructure network, and new smart converged services applied to different domains can be provided while working in conjunction with the SIP-based service of the existing infrastructure network.

Further, the present invention is advantageous in that the compatibility of service signaling and the change of system configuration to provide a smart converged service are relatively facilitated, and the time and cost required to construct the service may be reduced.

Although the configuration of the present invention has been described with reference to the preferred embodiments of the present invention, those skilled in the art will appreciate that the present invention can be implemented in other detailed forms without departing from the technical spirit or essential features of the invention. For example, the present invention can be implemented in various forms such as a storage medium in which a program for implementing the method of setting up a converged service session in a service virtual networking environment according to the present invention is recorded. Therefore, the above-described embodiments should be understood to be exemplary rather than restrictive in all aspects. Further, the scope of the present invention is defined by the accompanying claims rather than the detailed description of the invention. Furthermore, all changes or modifications derived from the scope and equivalents of the claims should be interpreted as being included in the scope of the present invention.

What is claimed is:

1. A method of setting up active networking of smart devices to provide a converged service, the method comprising:
broadcasting, by each of smart objects, an extended Session Initiation Protocol (SIP) message OBJECT_INFO to notify one hop neighbor smart objects of location information of the smart objects;
selecting a smart object among the smart objects neighboring a largest number of smart objects as a smart zone manager;
broadcasting, by the smart zone manager, an extended SIP message ZONE_INFO to neighbor smart objects to form a smart zone;
broadcasting, by the smart zone manager, converged service information to the neighbor smart objects;
comparing, by one of the smart objects, information about a neighbor smart object, among the neighbor smart objects, with other information about a smart zone to which the one of the neighbor smart objects belongs;
recognizing the one of the smart objects as a smart zone router, in response to the information about the one of the smart objects differing from the other information about the smart zone to which the one of the neighbor smart objects belongs;
transferring, by the smart zone router, the converged service information to a neighbor smart zone router of another neighbor smart zone to form service virtual networking; and
transferring, by a service initiation device, information about a converged service session to the smart zone manager,
wherein in the forming of the service virtual networking, a smart object desiring to join or leave the converged service session transfers information about joining or leaving to the service initiation device,
wherein each of the smart objects is configured to determine a transfer rate depending on distances to the one hop the neighbor smart objects and performance of the one hop neighbor smart objects based on a signal-to-noise ratio measured when extended SIP messages are received from the neighbor smart objects, and
wherein a smart object joining the converged service session selects a transmission path for service data to be transmitted in consideration of characteristics of the service data to be transmitted, transfer rate, residual capacity of a battery, and whether the service data is real-time service data.

2. The method of claim 1, wherein the smart zone router shares smart zone information with smart zone routers of other neighbor smart zones.

3. The method of claim 1, wherein in the broadcasting, each of the smart objects broadcasts the location information of the smart objects to the one hop neighbor smart objects.

4. The method of claim 1, wherein the smart zone information comprises the location information of the smart objects which belong to the smart zone.

5. The method of claim 1, wherein the smart object joining the converged service session selects the transmission path for the service data to be transmitted in further consideration of device resources of neighbor smart objects, and the transfer rate is measured when the extended SIP message is received from the neighbor smart objects.

6. An apparatus to set up active networking of smart objects to provide a converged service, the apparatus comprising:
smart objects which are processor-implemented and configured to form a smart zone, wherein each of smart objects is configured to broadcast an extended Session Initiation Protocol (SIP) message OBJECT_INFO to notify one hop neighbor smart objects of location information of the smart objects;
a smart zone manager configured to broadcast an extended SIP message ZONE_INFO to neighbor smart objects to form the smart zone, and to broadcast converged service information to the smart objects of the smart zone, wherein a smart object among the smart objects neighboring a largest number of the smart objects is selected as the smart zone manager;
a smart zone router configured to share information about a smart zone to which the smart zone router belongs with neighbor smart zones;
a signaling gateway configured to perform signaling conversion so that SIP signaling of an infrastructure network and an extended SIP message are compatible with each other; and
a service initiation device configured to transfer information about a converged service session to the smart zone manager, wherein a smart object desiring to join or leave the converged service session transfers information about joining or leaving to the service initiation device, wherein the smart zone router is further configured to transfer converged service information to a neighbor smart zone router of another neighbor smart zone to form service virtual networking, wherein the smart zone manager comprises:

an SIP user agent configured to generate the extended SIP message, an SIP proxy server configured to transmit extended SIP messages to members of the smart zone, a context-awareness unit configured to provide a context-awareness service to a user, an SIP register configured to manage the members of the smart zone using the extended SIP messages, and to register and manage location information of the members, and an intra-zone object information management unit configured to manage and store information about the smart objects present in the smart zone and information related to a setup, release, and change of a converged service session activated in the smart zone, wherein each of the smart objects is configured to determine a transfer rate depending on distances to the one hop neighbor smart objects and performance of the one hop neighbor smart objects based on a signal-to-noise ratio measured when the extended SIP messages are received from the neighbor smart objects, wherein a smart object joining the converged service session selects a transmission path for service data to be transmitted in consideration of characteristics of the service data to be transmitted, transfer rate, residual capacity of a battery, and whether the service data is real-time service data, wherein a Zone-ID header of the extended SIP message OBJECT_INFO is compared with an ID of the smart zone to which the smart object belongs, and the smart object recognizes itself as the smart zone router in response to the Zone-ID header and the ID being different, wherein the smart zone router is further configured to exchange a NEIGHBOR_INFO message, in which a Zone-Member header is updated, with neighbor smart zone routers to share zone member information, wherein the smart zone manager and the smart zone router distribute and manage information about intra-zone devices and neighbor-zone devices when a service virtual network composed of a plurality of smart zones is configured, and wherein the smart zone manager is further configured to perform a function of an SIP register for registering and managing location information carried in a 200 OK response message from each member of the smart zone, to carry location information of all members within the smart zone in the Zone-Member header of the extended SIP message ZONE_INFO, and to send the extended SIP message ZONE_INFO to share the location information.

7. The apparatus of claim 6, wherein the smart zone router is further configured to share smart zone information about the smart zone with smart zone routers of other neighbor smart zones.

8. The apparatus of claim 6, wherein each of the smart objects broadcasts location information of the smart objects to the one hop neighbor smart objects, and detects a number of the neighbor smart objects.

9. The apparatus of claim 6, wherein the smart zone information comprises the location information.

10. The apparatus of claim 6, wherein the transmission path in is selected in further consideration of device resources of the neighbor smart objects.

11. The apparatus of claim 6, wherein the transfer rate is measured when an extended SIP message is received from the neighbor smart objects.

12. The apparatus of claim 6, wherein the smart zone router comprises another SIP user agent configured to generate the extended SIP messages, another SIP proxy server configured to transmit the extended SIP messages to members of the smart zone, another context-awareness unit configured to provide another context-awareness service to a user, and a neighbor-zone object information management unit configured to manage and store information about smart objects present in the neighbor smart zones and information related to a setup, release, and change of a converged service session activated with respect to the neighbor smart zones.

13. The apparatus of claim 6, wherein the one of the smart objects other than the smart zone manager comprises another SIP user agent configured to generate the extended SIP messages, and another context-awareness unit configured to provide another context-awareness service to a user.

14. The apparatus of claim 6, wherein the signaling gateway comprises another SIP user agent configured to generate the extended SIP messages, another SIP proxy server configured to transmit the extended SIP messages to the members of the smart zone, another context-awareness unit configured to provide another context-awareness service to a user, another SIP register configured to manage the members of the smart zone using the extended SIP messages, and register and manage the location information of the members, and a signaling interworking device configured to perform the signaling conversion so that the SIP signaling of the infrastructure network and the extended SIP message are compatible with each other.

15. The apparatus of claim 6, wherein each of the smart objects is configured to notify the one hop neighbor smart objects of a presence of the smart objects, before the smart zone is formed.

16. The apparatus of claim 6, wherein the signaling gateway is further configured to send an OK response message carrying signaling gateway address information and an object type header, in response to receiving a zone information message which is periodically transmitted by the smart zone manager, and each of the smart objects is configured to determine that a smart object corresponding to a current destination is not present in the smart zone, and transfer local cache information to the signaling gateway or the smart zone router so that a final destination is detected and the local cache information is transmitted to the final destination, in response to each of the smart objects of the smart zone not being able to detect a location of a device at a transmission destination from the local cache information which is received via the zone information message.

\* \* \* \* \*